United States Patent
Houjou

(10) Patent No.: US 9,197,592 B2
(45) Date of Patent: Nov. 24, 2015

(54) SOCIAL NETWORK SERVICE SYSTEM, IMAGE DISPLAY METHOD, AND COMPUTER-READABLE STORAGE MEDIUM

(71) Applicant: CASIO COMPUTER CO., LTD., Tokyo (JP)

(72) Inventor: Yoshiharu Houjou, Tokyo (JP)

(73) Assignee: Casio Computer Co., Ltd, Tokyo (JP)

( * ) Notice: Subject to any disclaimer, the term of this patent is extended or adjusted under 35 U.S.C. 154(b) by 309 days.

(21) Appl. No.: 13/852,488

(22) Filed: Mar. 28, 2013

(65) Prior Publication Data

US 2013/0262582 A1 Oct. 3, 2013

(30) Foreign Application Priority Data

Mar. 30, 2012 (JP) .................................. 2012-078949
Feb. 28, 2013 (JP) .................................. 2013-039817

(51) Int. Cl.
*G06F 15/16* (2006.01)
*H04L 12/58* (2006.01)
*G06Q 50/00* (2012.01)

(52) U.S. Cl.
CPC ................ *H04L 51/32* (2013.01); *G06Q 50/01* (2013.01)

(58) Field of Classification Search
CPC ................................ G06Q 50/01; H04L 51/32
USPC .......................................... 709/204; 382/305
See application file for complete search history.

(56) References Cited

U.S. PATENT DOCUMENTS

| | | | | |
|---|---|---|---|---|
| 5,594,558 | A | * | 1/1997 | Usami et al. ................... 358/518 |
| 2008/0187249 | A1 | * | 8/2008 | Konishi ......................... 382/306 |
| 2009/0016576 | A1 | * | 1/2009 | Goh et al. ...................... 382/118 |
| 2009/0160880 | A1 | * | 6/2009 | Park et al. ...................... 345/690 |
| 2009/0165140 | A1 | * | 6/2009 | Robinson et al. ............... 726/26 |
| 2009/0249244 | A1 | * | 10/2009 | Robinson et al. ............. 715/781 |
| 2009/0322958 | A1 | * | 12/2009 | Toriyama ...................... 348/714 |
| 2010/0105440 | A1 | * | 4/2010 | Kruzeniski et al. ........... 455/566 |
| 2010/0245377 | A1 | * | 9/2010 | Ito et al. ........................ 345/589 |
| 2011/0229022 | A1 | * | 9/2011 | Yamada ........................ 382/162 |
| 2012/0050769 | A1 | * | 3/2012 | Houjou et al. ................. 358/1.9 |

(Continued)

FOREIGN PATENT DOCUMENTS

| | | | | |
|---|---|---|---|---|
| CA | 2504616 A1 | * | 6/2004 | ............... G06K 9/00 |
| JP | 2003-187215 A | | 7/2003 | |

(Continued)

OTHER PUBLICATIONS

Haque et al., "IRENE: Context aware mood sharing for social network," Service-Oriented Computing and Applications (SOCA), 2011 IEEE International Conference on , vol., No., pp. 1,8, Dec. 12-14, 2011. doi: 10.1109/SOCA.2011.6166228.*

(Continued)

*Primary Examiner* — Kostas Katsikis
(74) *Attorney, Agent, or Firm* — Fitch Even Tabin & Flannery LLP

(57) ABSTRACT

A social network service system includes a server wherein a terminal of a member is connectable to the server. The server includes a memory configured to store a home screen includes top image data for each member, a selector configured to select a type of an image processing, and a processor configured to process, at a predetermined timing, the top image data of a member in accordance with the type of the image processing which is selected by the selector.

15 Claims, 17 Drawing Sheets

(56) References Cited

U.S. PATENT DOCUMENTS

| | | | |
|---|---|---|---|
| 2012/0209859 A1* | 8/2012 | Blount | 707/748 |
| 2012/0246223 A1* | 9/2012 | Newhouse et al. | 709/203 |
| 2013/0021322 A1* | 1/2013 | Joo et al. | 345/418 |
| 2013/0101219 A1* | 4/2013 | Bosworth et al. | 382/195 |
| 2013/0191394 A1* | 7/2013 | Bradley et al. | 707/738 |
| 2013/0212606 A1* | 8/2013 | Kannan et al. | 725/12 |

FOREIGN PATENT DOCUMENTS

| | | | | |
|---|---|---|---|---|
| JP | 2006-099753 A | | 4/2006 | |
| JP | 2006-309660 A | | 11/2006 | |
| JP | 2008-242639 A | | 10/2008 | |
| JP | 2009-42841 A | | 2/2009 | |
| JP | 2009-223500 A | | 10/2009 | |
| JP | 2009-237996 A | | 10/2009 | |
| JP | 2010227118 A | * | 10/2010 | C12M 1/34 |

OTHER PUBLICATIONS

Japanese Office Action date of mailing Apr. 1, 2015 for Japanese Patent Application No. 2013-039817and English translation of the same.(12 pages).

* cited by examiner

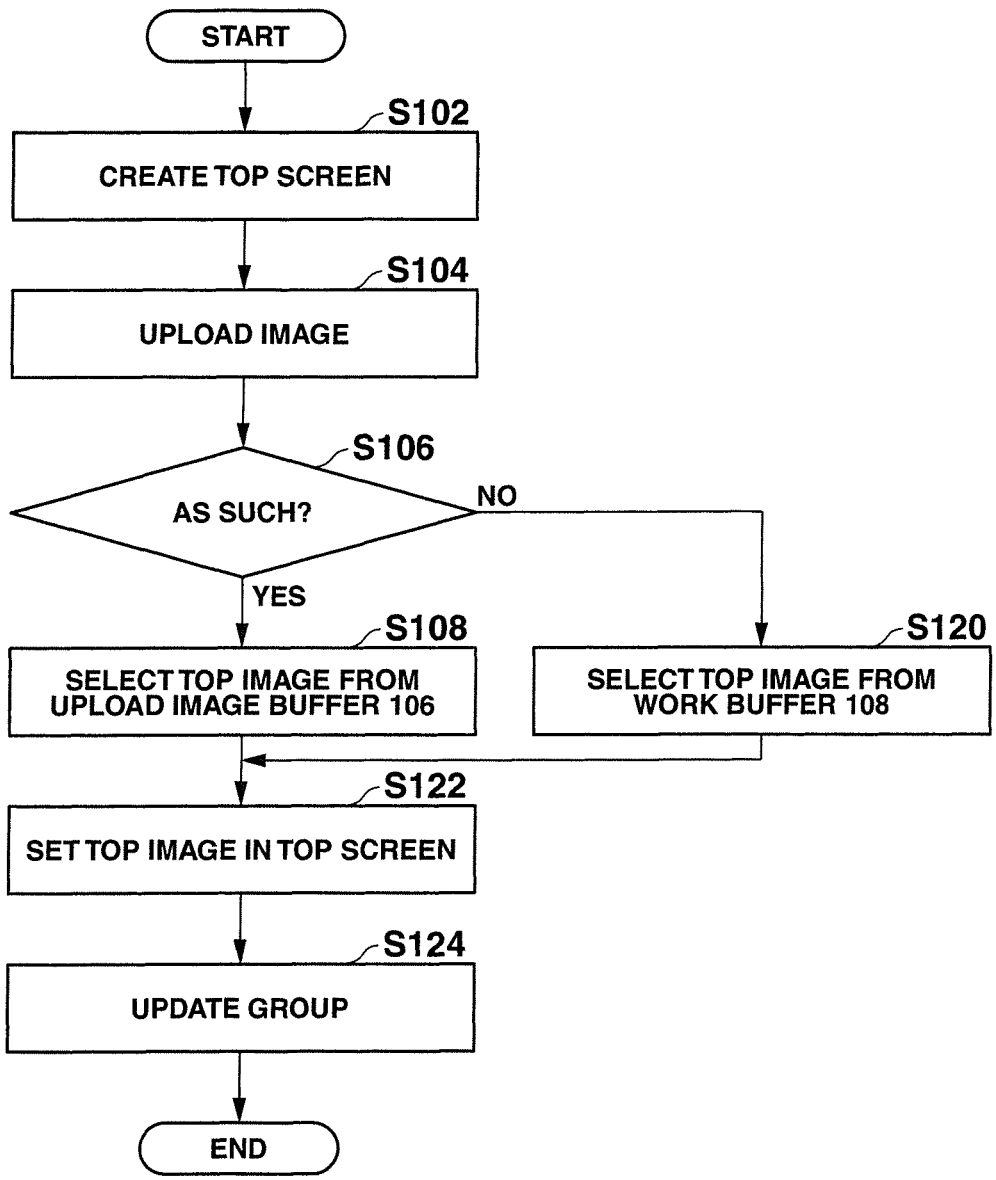

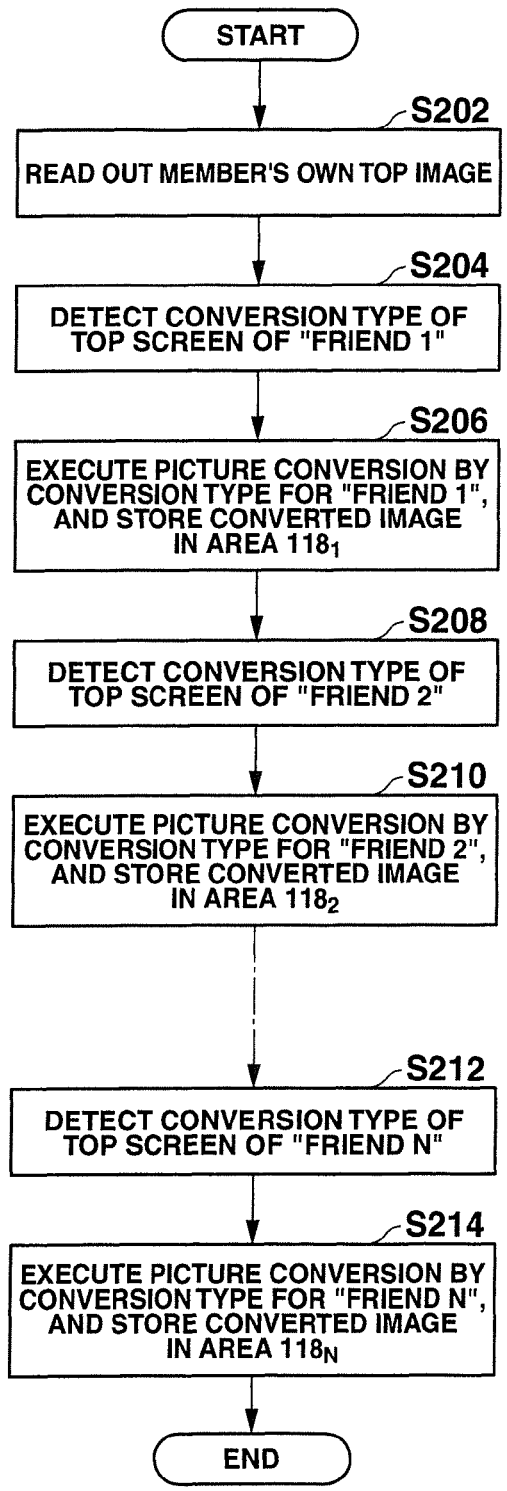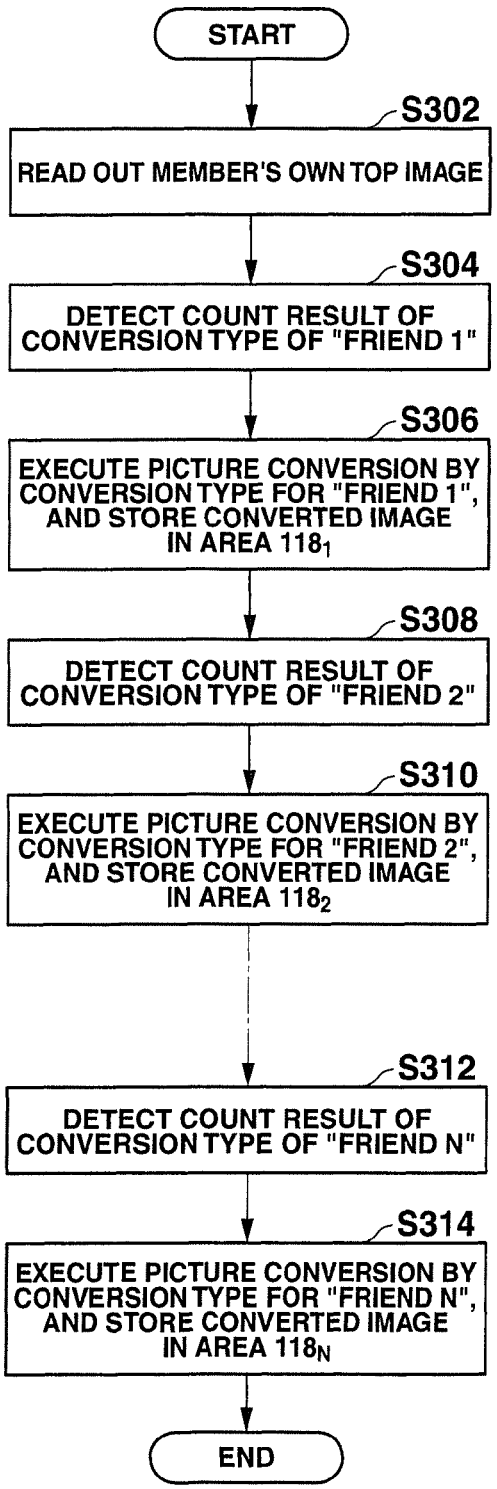

SOCIAL NETWORK SERVICE SYSTEM, IMAGE DISPLAY METHOD, AND COMPUTER-READABLE STORAGE MEDIUM

CROSS-REFERENCE TO RELATED APPLICATIONS

This application is based upon and claims the benefit of priority from prior Japanese Patent Applications No. 2012-078949, filed Mar. 30, 2012; and No. 2013-039817, filed Feb. 28, 2013, the entire contents of all of which, are incorporated herein by reference.

BACKGROUND OF THE INVENTION

1. Field of the Invention

The present invention relates to an SNS (social network service) system which performs an image processing.

2. Description of the Related Art

In recent years, a members-only communication service (social network system, hereinafter referred to as SNS) has been gaining in popularity. In general, the SNS system is constructed not by a tree structure but by a semi-lattice structure. In the semi-lattice structure, unlike a tree structure in which all lower-level sets are included in an upper-level set, a structural element of one set is included in a plurality of lower-level sets, and sets with interlaced inclusive relations are constituted.

In the SNS system, there is a concept of "friends" (see, e.g. Jpn. Pat. Appln. KOKAI Publication No. 2006-309660), and "friends" are one of sets.

For example, FIG. 1 illustrates a friend network in a case where attention is paid to member "A". Member "B" (hereinafter the word "member" is omitted, and simply "A", "B", . . . , are referred to), "C" and "D" have a friendship, "B1" and "B2" have a friendship with "B", and "B11" and "B12" have a friendship with "B1". Further, "D1" has a friendship with "D", and "D11" and "D12" have a friendship with "D1".

As indicated by "r1" in FIG. 1, there may be a case in which friend "D12" of friend "D1" of "D", that is a friend of "A", has a friendship with "A".

In the meantime, in such an SNS, there are many cases in which members show photos, which are stored on a server, to each other (see, e.g. Jpn. Pat. Appln. KOKAI Publication No. 2008-242639).

In the description below, a member uploads a photo to a server, and the photo itself, which is made public on the Internet as such, or an image, which is created by subjecting the photo to image processing and is made public on the Internet, is referred to as "work".

A member prepares, in his/her own home page (also referred to as "my page"), a top screen having his/her own top image. The top screen is a so-called home screen.

In the SNS system, a picture conversion service for image data is provided as an image processing. Thus, there are many members who adopt images which are created by subjecting the top images to the picture conversion. There are many types of picture conversion, such as an oil painting, thick oil painting, gothic oil painting, fauvist oil painting, water color painting, gouache painting, pastel painting, color pencil sketch, pointillism, silkscreen, drawing, and air brush. For example, if a color pencil sketch type is used for picture conversion of a member's own top image, it is highly possible that this member likes the type of color pencil sketch tone, and it can be supposed that this member will have a friendship with a member who likewise adopts the color pencil sketch tone for picture conversion of the top image, and it is considered that these members will make a group.

FIG. 2 illustrates an example in which members, including members who have no friendship, are grouped. Symbol "g1" denotes a group which is a set having a predetermined objective. The group "g1" includes members, such as "A" and "F", who have no friendship.

Jpn. Pat. Appln. KOKAI Publication No. 2006-99753, discloses a grouping technique in the SNS. Jpn. Pat. Appln. KOKAI Publication No. 2006-99753 provides a grouping method of names and keywords, which is characterized by including a step of accepting an input from an input module of names and keywords, a step of producing a cooccurrence matrix of the input names and keywords, and a step of clustering the names and keywords in the produced cooccurrence matrix.

In the prior art, however, an SNS relating to a picture conversion technology and a technique relating to such an SNS have not been proposed. In Jpn. Pat. Appln. KOKAI Publication No. 2006-99753, based on a personal name or company name, a product name, a document name, etc., that is, based on text data, grouping is executed by language processing or syntax analysis. In Jpn. Pat. Appln. KOKAI Publication No. 2006-99753, there is no concept of executing grouping based on image data. Thus, in the actual situation, it has not been practiced to increase an interest by merging a picture conversion technology into an SNS or, conversely, by merging an SNS into a picture conversion technology.

BRIEF SUMMARY OF THE INVENTION

The present invention has been made in consideration of the above-described situation, and the object of the invention is to provide a social network service system which can increase an interest by merging an image processing technology into the SNS, an image display method, and a computer-readable storage medium.

According to the present invention, a social network service system includes a server wherein a terminal of a member is connectable to the server. The server includes a memory configured to store a home screen including top image data for each member, a selector configured to select a type of an image processing, and a processor configured to process, at a predetermined timing, the top image data of a member in accordance with the type of the image processing which is selected by the selector. According to the present invention, an interest can be increased by merging an image processing technology into an SNS, or by merging an SNS into an image processing technology.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a flowchart illustrating a process procedure of a top screen creation process.

FIG. 8A and FIG. 8B are flowcharts illustrating process procedures of a top image creation process for each friend.

DETAILED DESCRIPTION OF THE INVENTION

Embodiments of the present invention will now be described with reference to the accompanying drawings. The embodiments provide an image processing service to increase an interest. An example of the image processing service includes a picture conversion service. The picture conversion service includes many types of picture conversion. One type of the picture conversion includes changing a tone of an original image.

Figure 1:
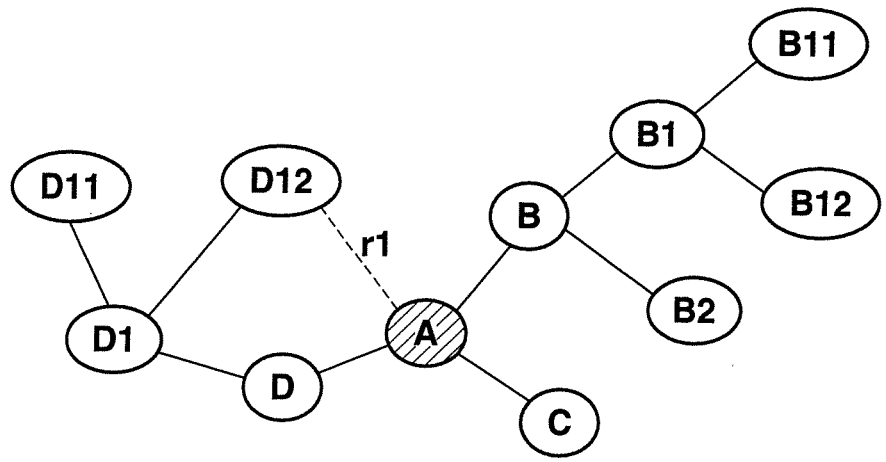
FIG. 1 illustrates a friend network in a case where attention is paid to member "A".
Figure 2:
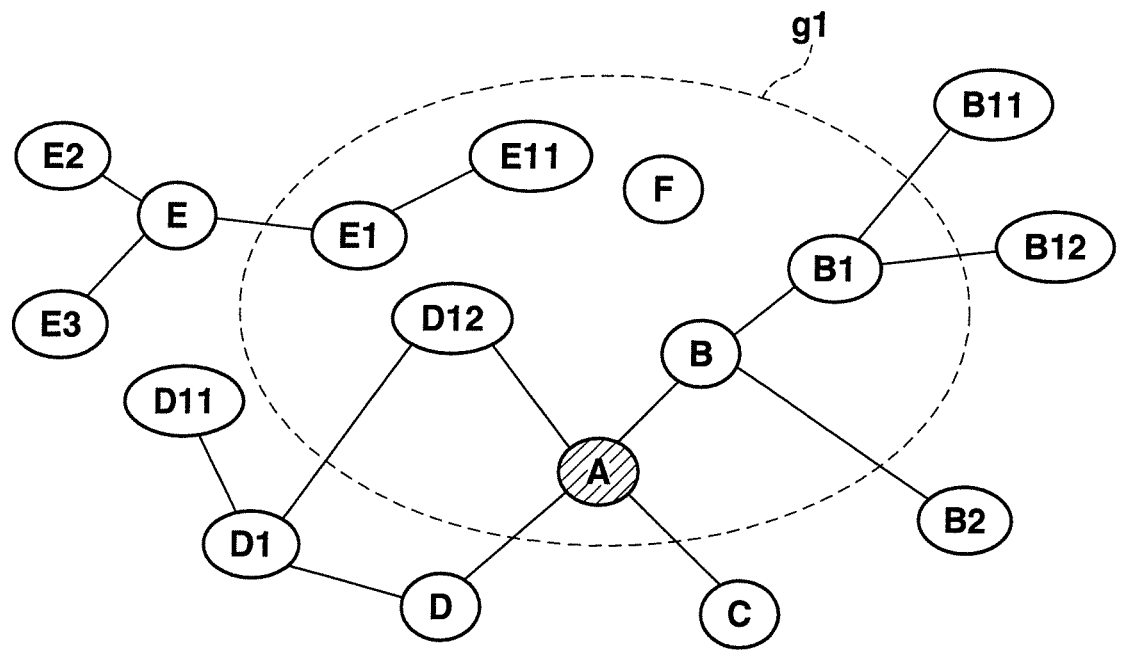
FIG. 2 illustrates an example in which members, including members who have no friendship, are grouped.
Figure 3:
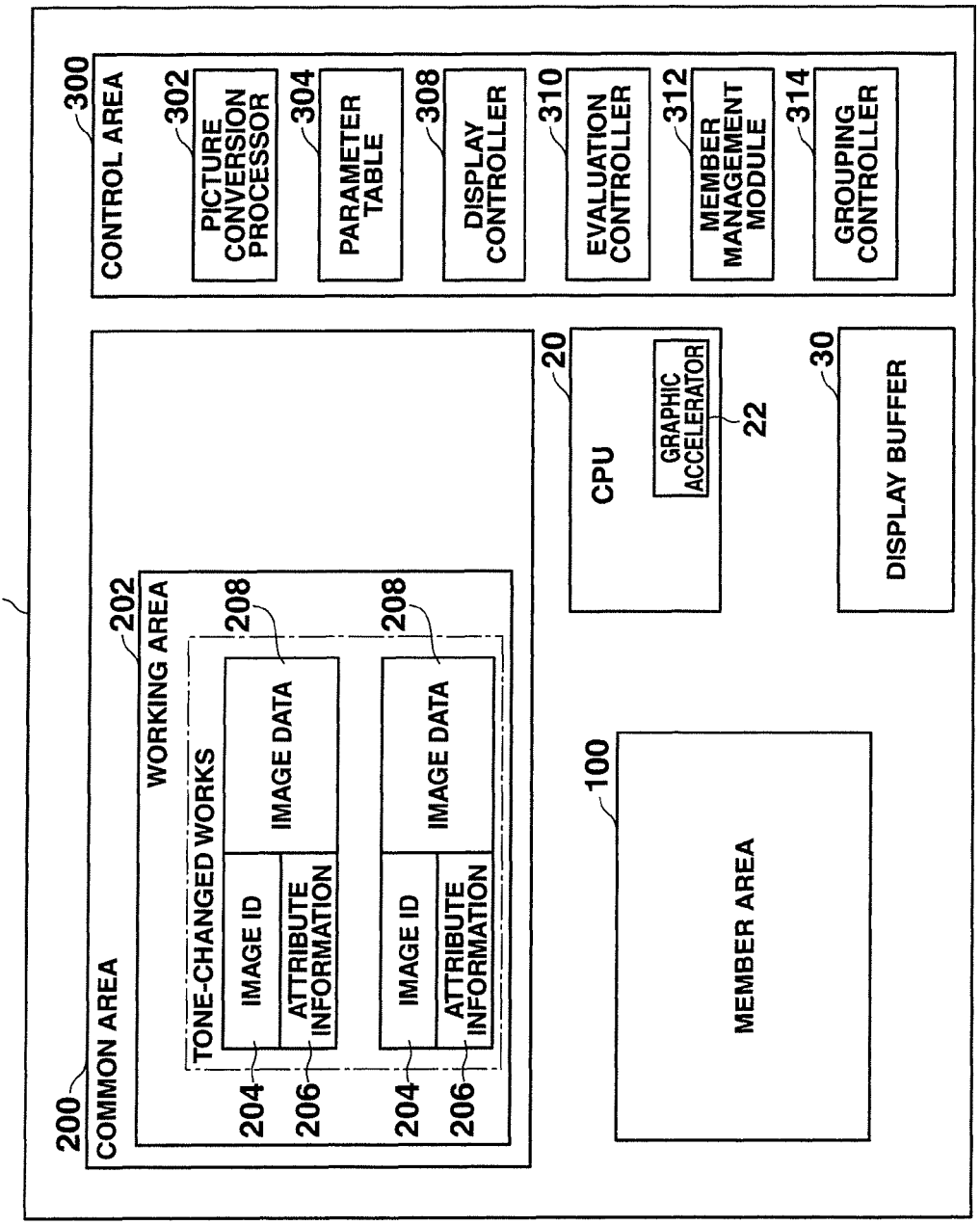
FIG. 3 is a block diagram illustrating a main part of the structure of a server which realizes an SNS site.

FIG. 3 is a block diagram illustrating a main part of the structure of a server 11 which realizes an SNS site 10. The server 11 includes a member area 100, a common area 200 and a control area 300.

Figure 4:
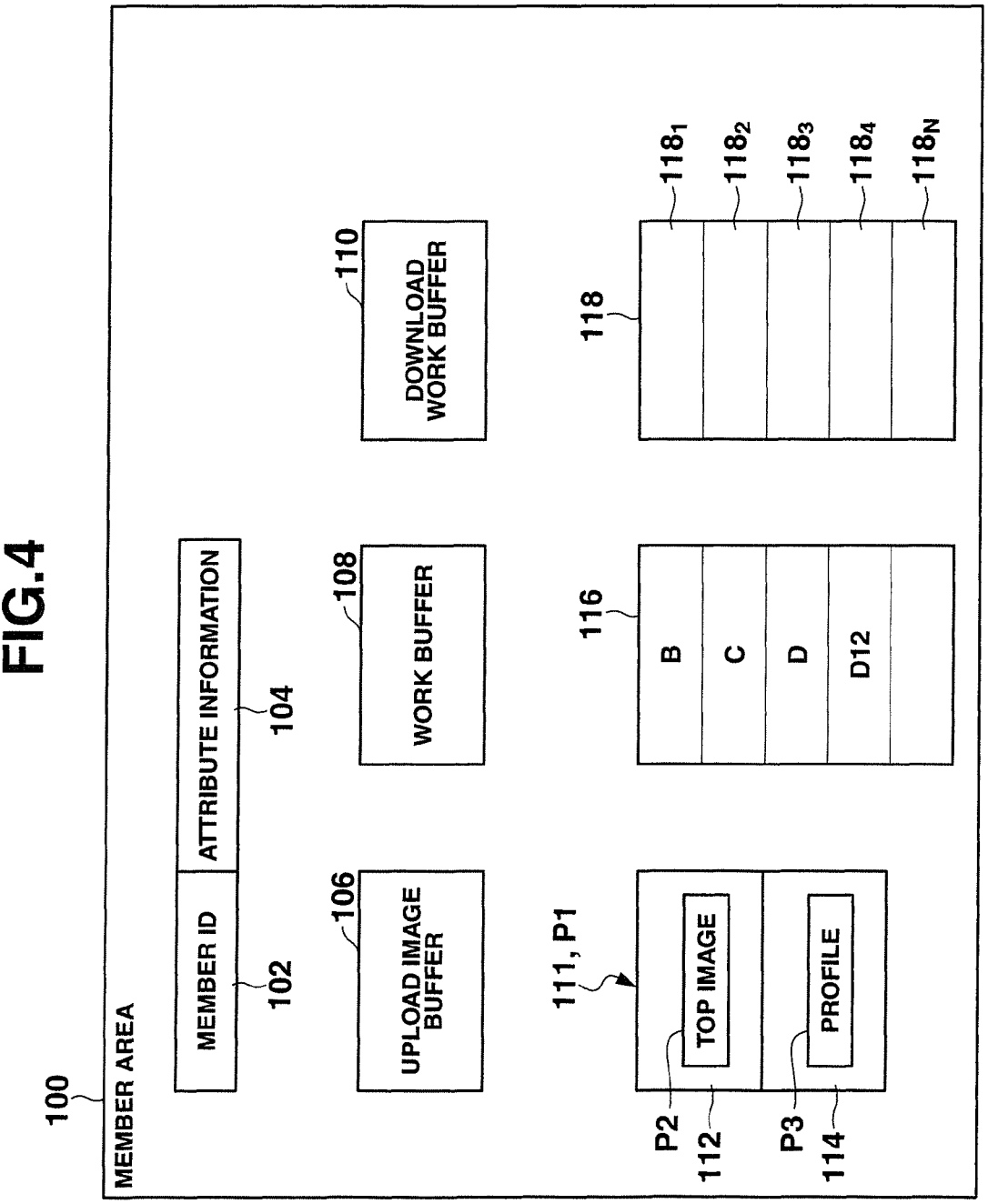
FIG. 4 is a block diagram illustrating the details of a member area.

As illustrated in detail in FIG. 4, the member area 100 is an area which is provided for each registered member, and stores a member ID 102 for identifying the member, and various member attribute information 104 of each member in association with the member ID 102.

Figure 5:
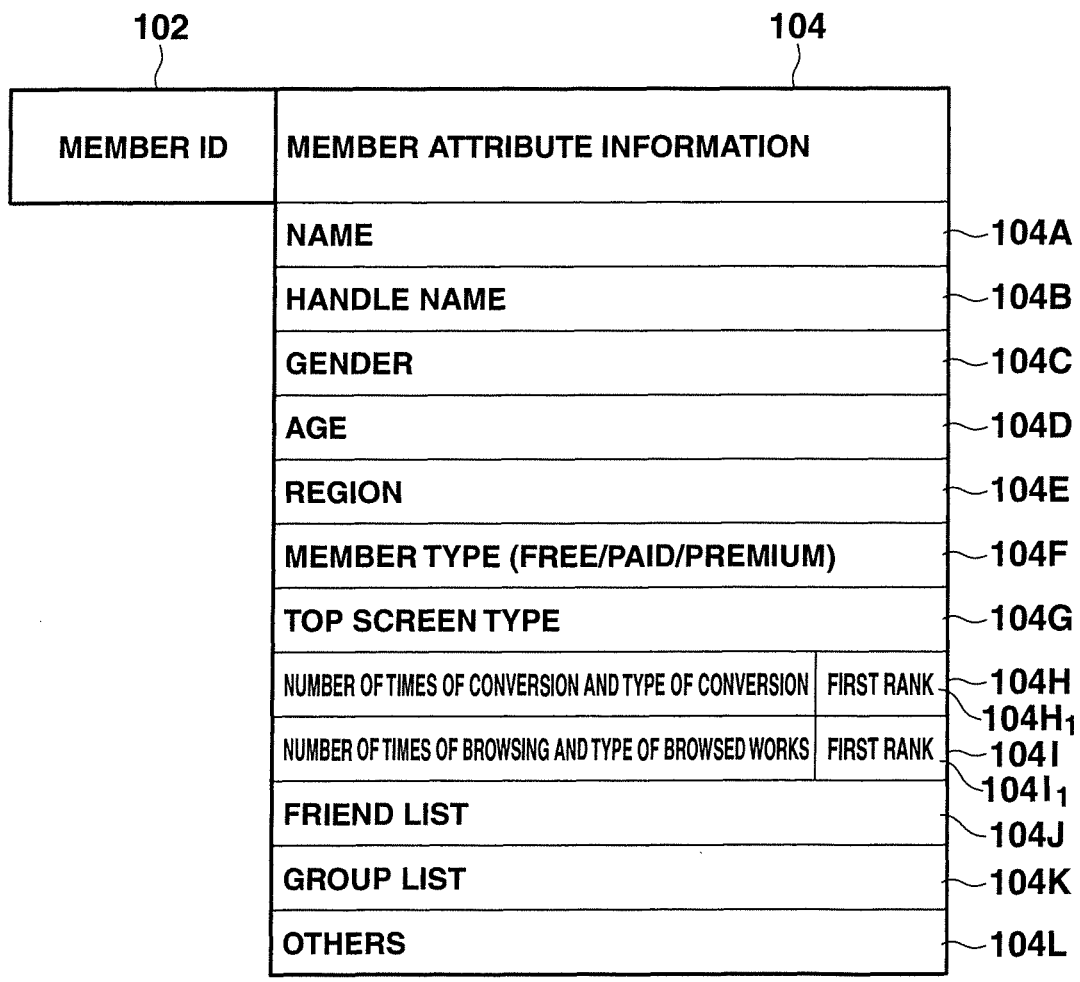
FIG. 5 illustrates contents of member attribute information.

The member attribute information 104 includes, for example, as shown in FIG. 5, a name 104A, a handle name 104B, a gender 104C, an age 104D, a region 104E, a member type 104F, and, as other member unique information, a top screen type 104G, a number of times of conversion and type of conversion 104H, a number of times of browsing and type of browsed works 104I, a friend list 140J, a group list 104K, and others 104L. The member type 104F is a free member who is simply registered for free, a paid member who is registered with payment, or a premium member who paid a special membership fee.

In the a number of times of conversion and type of conversion 104H, the type of picture tone selected when the member executed picture conversion and the number of times of picture conversion are recorded. The type of picture tone, which has most frequently been selected by the member, is stored in $104H_1$. In addition, in the number of times of browsing and type of browsed works 104I, the type of picture tone, which has most frequently been browsed by the member among published works, and the number of times of browsing are recorded. The type of picture tone, which has most frequently been browsed by the member, is stored in $104I_1$.

In the friend list 140J, the ID of a friend member (friend) of the present member, is stored. In the group list 104K, a classified group name, to which the present member belongs, is stored. The group name is a name of a group of each type of picture conversion tone, such as oil painting, water color painting, pastel painting, etc. The group is not limited to the type of picture conversion. For example, the group may be a group of members who use picture-converted images as the top images P2, or a group of members who do not use picture-converted images as the top images P2. The group is a set of members who have a predetermined common item and are logically connected on the network.

In addition, the member area 100 (FIG. 4) includes an upload image buffer area 106 in which image data of photos uploaded by the member is stored; a work buffer area 108 in which picture-tone images (works), which have been picture-converted in the SNS site 10, are stored; a download work buffer area 110 which downloads and stores works of other members; a top screen storage area 111 in which the top screen P1 is stored (the area 111 includes a top image storage area 112 in which the top image P2 is stored, and a profile storage area 114 in which a profile P3 of the member is stored); a friend list area 116 in which member IDs of members, who are friends of the present member, are stored; and a top-screens-for-friends area 118 in which the top screens P1 of the present member, which are displayed on the terminals of the friends stored in the friend list area 116, are stored (area 118 includes an N-number of areas $118_1$ to $118_N$ divided for respective friends).

The common area 200 in FIG. 3 is an area which is provided common to all members. The common area 200 includes a work area 202 in which many works, which were created by converting images uploaded by members to picture tones, are stored.

Each of works stored in the work area 202 includes image data 208, an image ID 204 for identifying the work, and image attribute information 206 indicative of the attribute of each image.

Figure 6:
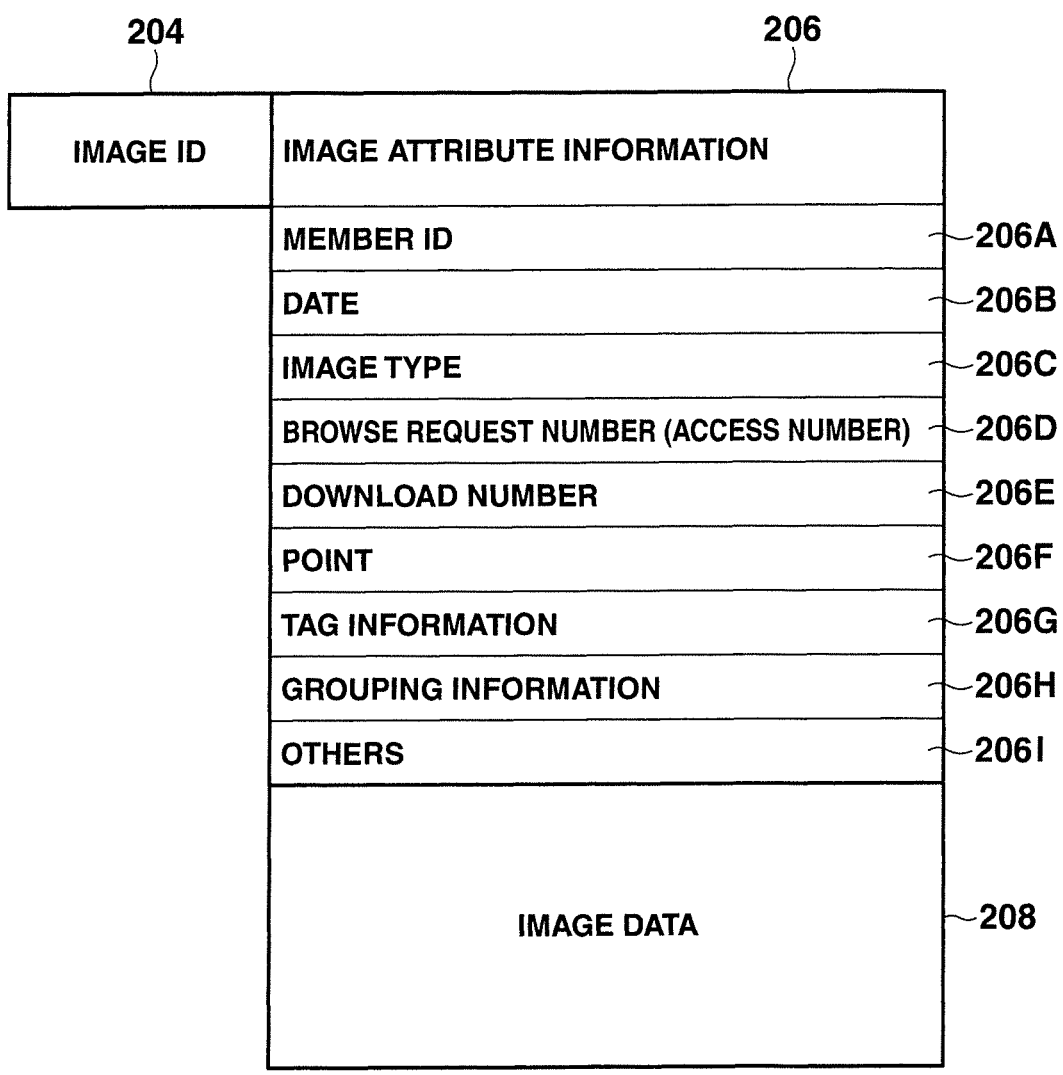
FIG. 6 illustrates contents of image attribute information.

As shown in FIG. 6, the image attribute information 206 includes a member ID 206A indicative of the poster of the work; date information 206B of, e.g. a date of creation or a date of posting; image type information 206C such as a size of image data and type of picture tone; browse request number (access number) information 206D indicative of the number of times of browsing of the work; download number information 206E indicative of the number of times of download of the work; point information 206F indicative of the evaluation of the work; tag information 206G for attaching a tag indicating what the work relates to, such as a person, nature, flower, morning glory, etc.; grouping information 206H indicative of a group if the work belongs to the group; and other information 206I which is unique to the work. These information items are stored together with the image ID 204 and image data 208.

From the member ID 206A, the creator of the work is understood, and it can be determined whether the creator is a free member, a paid member or a premium member. In addition, from the tag information 206G, the work can be categorized. Furthermore, from the grouping information 206H, the work can be grouped.

The control area 300 shown in FIG. 3 includes a picture conversion processor 302, a parameter table 304, a display controller 308, an evaluation controller 310, a member management module 312, and a grouping controller 314.

The picture conversion processor 302 executes a picture conversion process for changing a tone of image data, which is stored in the upload image buffer area 106, to a picture-tone. The parameter table 304 stores parameters for picture conversion, which are referred to when the picture conversion process is executed. The display controller 308 stores a control program for displaying the work on the screen.

The evaluation controller 310 evaluates the works, which are stored in the work buffer area 108 of the member area 100, in accordance with the number of times of access, and gives points to each work. The member management module 312 manages the members by the member IDs, and controls respective services for the free member, paid member and premium member. The member management module 312 also controls the SNS function of the SNS site 10. The grouping controller 314 executes a process of grouping members, as will be described later with reference to FIG. 9.

In addition, the server 11 is provided with a CPU 20 and a display buffer 30. The CPU 20 controls the entirety of the server 11, based on various control programs stored in the control area 300, and executes various processes which are necessary for displaying many works in a table format on the Internet. Besides, the CPU 20 includes a graphic accelerator 22 for executing a high-level graphic process. By the graphic accelerator 22, images can be categorized and displayed, as will be described later, by simply designating some conditions from driver software. In the meantime, the above-described driver software is, for example, a publicly known open GL with a high general-purpose applicability and an extension library for using the open GL.

The display buffer 30 is a working memory for developing images for display, when the CPU 20 displays many works in a table format.

Next, concrete operations of the image display system of the present embodiment will be described with reference to flowcharts.

To begin with, referring to FIG. 7, a top screen creation flow, which is executed by the server 11, is described. Although not illustrated, a member terminal of the SNS is connected to the server 11 over a network. Responding to a request from the member terminal, the server 11 creates a top screen P1 of the present member (step S102). In addition, the server 11 accepts upload of an image (photo) from the member terminal and stores the image (photo) in the upload image buffer area 106 (step S104). Further, the server 11 determines the presence/absence of an instruction from the member as to whether the uploaded image is to be used as the top screen P1 as such or not (step S106).

When an instruction ("as such") to use the image as such has been received from the member, the server 11 prompts the member to select any one of the images of the member, which are stored in the upload image buffer area 106, as the top image P2 in accordance with an operation from the member terminal (step S108). Conversely, when an instruction to use a picture-converted image, instead of using the uploaded image as such, has been received from the member, the server 11 prompts the member to select a top image P2 from the work buffer area 108 which stores picture-tone images (works) which were created by picture-converting the top image P2 in the SNS site 10 (step S120). Subsequently, the server 11 sets the top image P2, which has been selected in step S108 or step S120, in the top screen P1 (step S122).

Figure 13:
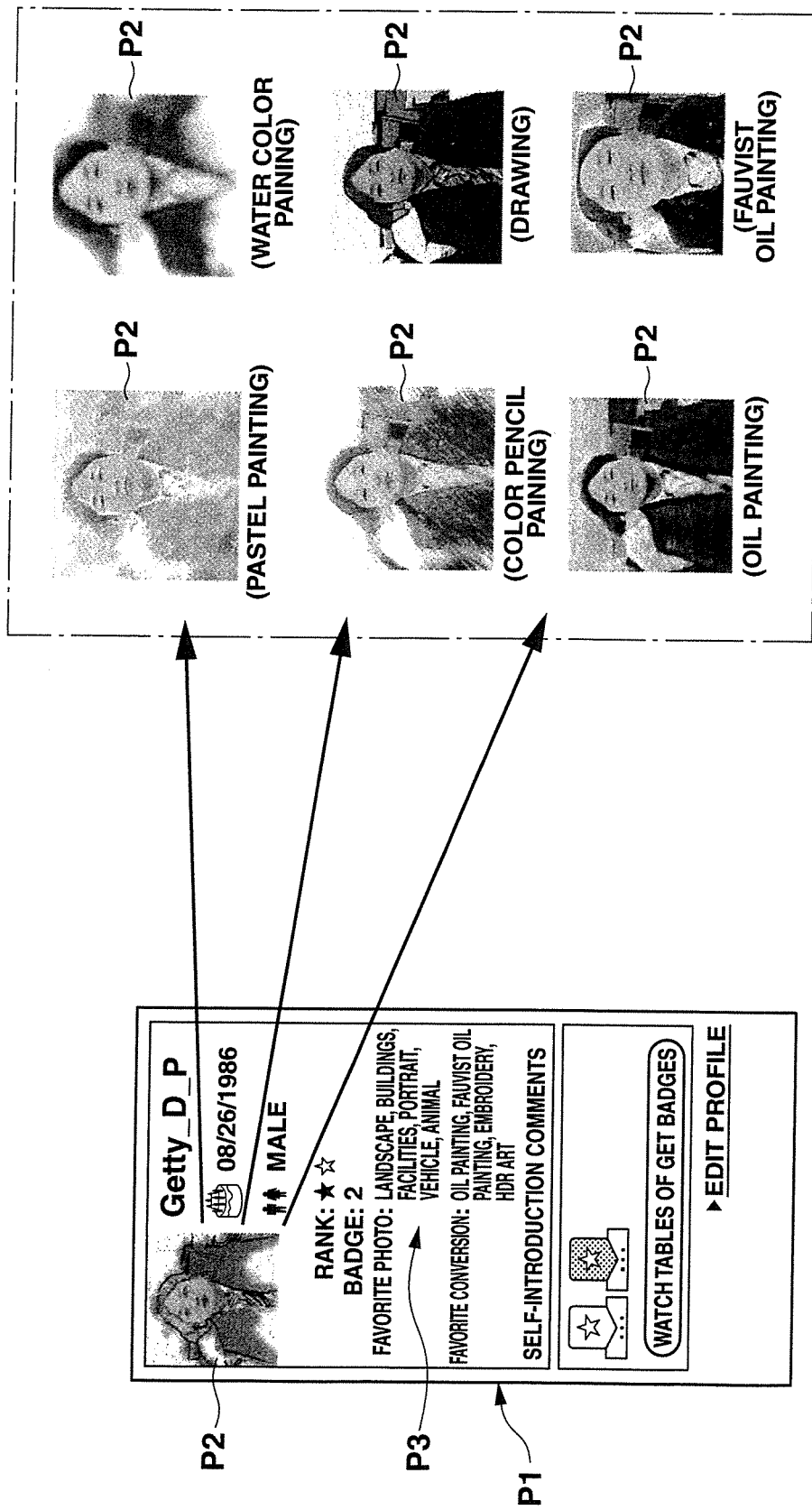
FIG. 13 illustrates a top screen and a top image.

FIG. 13 illustrates an example of the top screen P1. The top screen P1 is composed of the top image P2 which is set in a part of the top screen P1, and profile contents (character strings) P3 of the member, such as rank, badge, favorite photo and favorite conversion. In step S122, the server 11 executes a process of setting the top image P2 in the top screen P1. Thereafter, as illustrated in FIG. 14, the server 11 executes a group update process (step S124), and updates the group into which the present member is classified.

Figure 14:
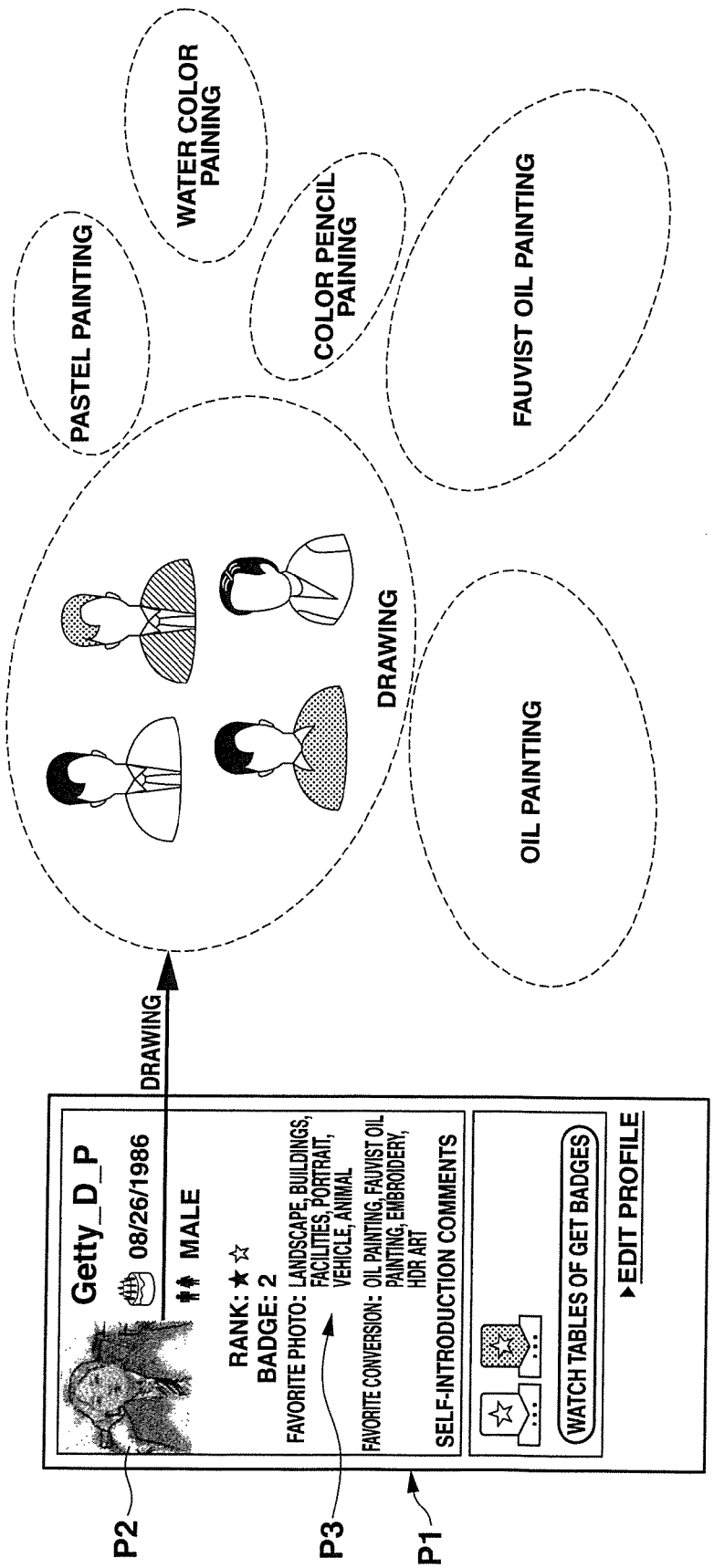
FIG. 14 illustrates another top screen and another top image.

FIG. 14 illustrates a state in which members are being grouped in accordance with the type of picture tone of the top image data P2 of the top screen P1 of the present member.

FIG. 8A is a flowchart illustrating a process procedure of a top image creation process for each friend. The server 11 reads out the top image P2 from the top image storage area 112 in the present member's own member area 100 in response to a request from the member terminal (step S202).

Subsequently, the server 11 detects the conversion type, i.e. any one of the above-described oil painting, water color painting, pastel painting, etc., of the top image P2 which is set in the top screen P1 of "friend 1" who is the first friend stored in the top-screens-for-friends area $118_1$ of the member area 100 (step S204).

Thereafter, the server 11 picture-converts the top image P2 in the top screen P1 of the present member, which has been read out in step S202, by using the conversion type for "friend 1", which has been detected in step S204, and stores the picture-converted image in the area $118_1$ of the top-screens-for-friends area 118 (step S206). In addition, the server 11 detects the conversion type of the top image P2 in the top screen P1 of "friend 2" (step S208), picture-converts the top image P2 in the top screen P1 of the present member, which has been read out in step S202, by using the conversion type for "friend 2", which has been detected in step S208, and stores the picture-converted image in the area $118_2$ of the top-screens-for-friends area 118 (step S210). Similarly, the server 11 detects the conversion type of the top image P2 in the top screen P1 of "friend N" (step S212), picture-converts the top image P2 in the top screen P1 of the present member, which has been read out in step S202, by using the conversion type for "friend N", which has been detected in step S212, and stores the picture-converted image in the area $118_N$ of the top-screens-for-friends area 118 (step S214).

Thus, by the execution of the above process illustrated in the flowchart of FIG. 8A, for example, if the present member is "A", the top screen P1 of member "A" including the top image P2 of member "A", which has been converted by using the same conversion type as the conversion type of the top image P2 of each of friends "1" to "N", is stored in the areas $118_1$ to $118_N$ of the top-screens-for-friends area 118.

FIG. 8B is a flowchart illustrating another process procedure of the top image creation process for each friend. The server 11 reads out the top image P2 from the top image storage area 112 in the present member's own member area 100 in response to a request from the member terminal (step S302). Subsequently, based on first-rank information $104H_1$ included in the number of times of conversion and type of conversion 104H in the member attribute information 104 of "friend 1" who is the first friend stored in the top-screens-for-friends area $118_1$ of the member area 100, the server 11 detects the conversion type, i.e. any one of the above-described oil painting, water color painting, pastel painting, etc., which is the conversion type with a largest number of times of conversion (step S304).

Thereafter, the server 11 picture-converts the top image P2 in the top screen P1 of the present member, which has been read out in step S302, by using the conversion type for "friend 1", which has been detected in step S304, and stores the picture-converted image in the area 118$_1$ of the top-screens-for-friends area 118 (step S306). In addition, the server 11 detects the conversion type with a largest number of times of conversion of "friend 2" (step S308), picture-converts the top image P2 in the top screen P1 of the present member, which has been read out in step S302, by using the conversion type for "friend 2", which has been detected in step S308, and stores the picture-converted image in the area 1182 of the top-screens-for-friends area 118 (step S310). Similarly, the server 11 detects the conversion type with a largest number of times of conversion of "friend N" (step S312), picture-converts the top image P2 in the top screen P1 of the present member, which has been read out in step S302, by using the conversion type for "friend N", which has been detected in step S312, and stores the picture-converted image in the area 118N of the top-screens-for-friends area 118 (step S314).

Thus, by the execution of the above process illustrated in the flowchart of FIG. 8B, for example, if the present member is "A", the top screen P1 of member "A" including the top image P2 of member "A", which has been converted by using the same conversion type as the conversion type with a largest number of times of conversion of each friend, is stored in the areas 1181 to 118N of the top-screens-for-friends area 118.

Figure 9:
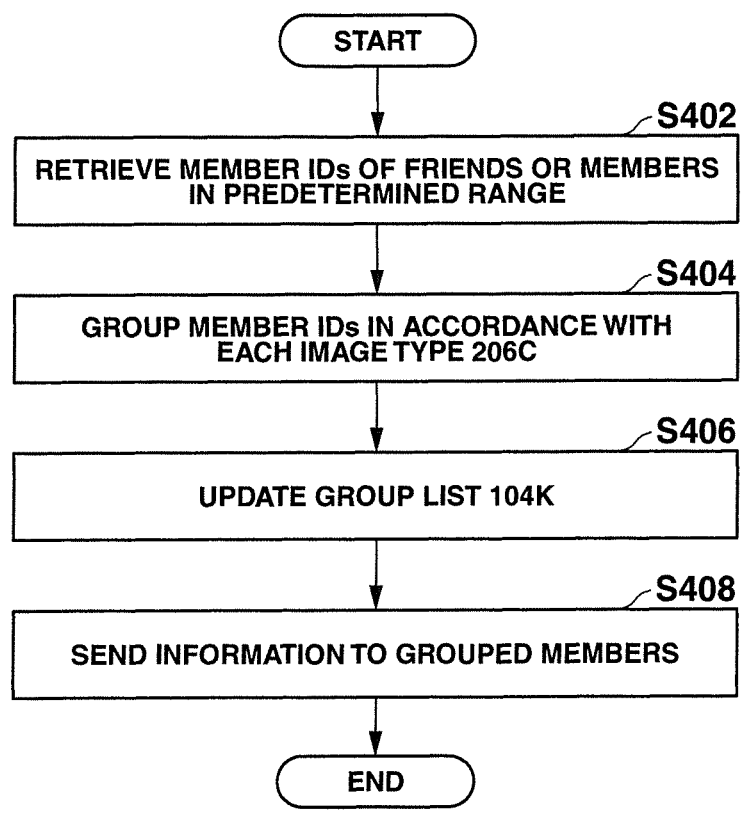
FIG. 9 is a flowchart illustrating the process procedure of a grouping process.

FIG. 9 is a flowchart illustrating a process procedure of a grouping process. The server 11 retrieves member IDs of friends or members in a predetermined range (step S402). Then, the server 11 groups the retrieved member IDs in accordance with each image type indicated by the information stored in the image type information 206C (step S404). Subsequently, the server 11 updates the group list 104K in the various member attribute information 104 of each member (step S406). Accordingly, by the execution of the above process illustrated in the flowchart of FIG. 9, friends of a certain member or members in a predetermined range are grouped in accordance with image types, such as an oil painting group, a water color painting group, a pastel painting group, etc. Thereafter, the server 11 sends information to the grouped members (step S408). The creator of this information that is to be sent may be any one of the respective members and the administrator of the server 11.

Thus, with the above process illustrated in the flowchart of FIG. 9 being executed, and with information being sent to the grouped members, the following operations and advantageous effects can be obtained.

<Operations>

(1) Members are grouped in accordance with each conversion type, which is used on the top screen P1, thereby performing sharing of works and friend recommendation.

(2) Members are grouped in accordance with each conversion type, which is used on the top screen P1, thereby notifying, for example, a water color painting contest if the conversion type is water color painting.

(3) Members are grouped in accordance with each conversion type with a large number of times of use by members in the previous day (or previous log-in), in the previous month, etc., thereby performing sharing of works and friend recommendation.

(4) In accordance with each conversion type with a large number of times of use by members in the previous day (or previous log-in), in the previous month, etc., a guide of, for example, a water color painting contest is notified if the conversion type is water color painting.

(5) Members are grouped in accordance with each conversion type which is registered as a favorite conversion type by members, thereby performing sharing of works and friend recommendation.

(6) In accordance with each conversion type which is registered as a favorite conversion type by members, a guide of, for example, a water color painting contest is notified if the conversion type is water color painting.

<Advantageous Effects>

As a result, in order to activate communication through converted images and works and to create a community, and to share favorite images, members are internally grouped by the frequently used conversion type or favorite conversion type, and sharing of works and event guides can be notified to each group and communication and creation of communities can be efficiently promoted.

In addition, a gallery or categorization according to each conversion type can be realized, and as the number of conversion types is increasing hereafter, members can be efficiently and effectively grouped according to favorites, and communication and communities can be activated.

Figure 10:
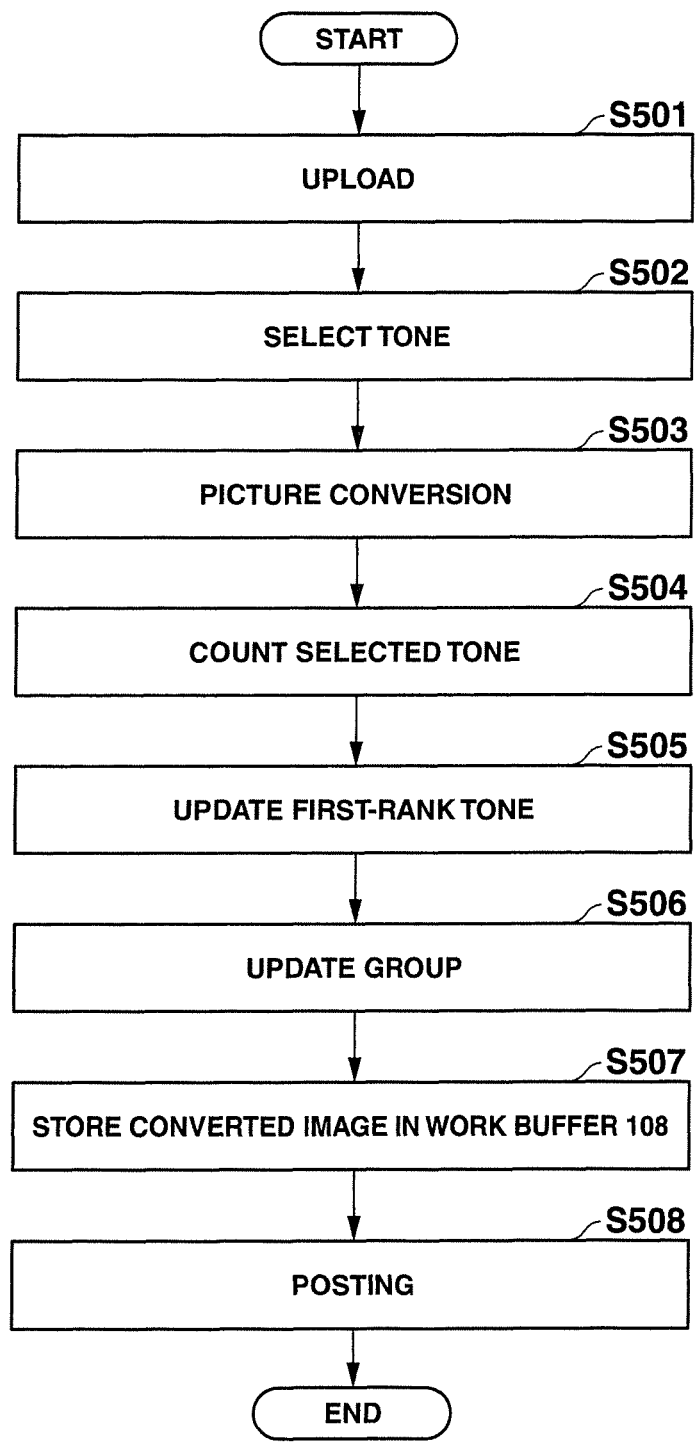
FIG. 10 is a flowchart illustrating the process procedure of an upload/posting process.

FIG. 10 is a flowchart illustrating the process procedure of an upload/posting process. The server 11 accepts upload of an image (photo) from a member terminal, and stores the image (photo) in the upload image buffer area 106 (step S501). In addition, the server 11 selects the type of picture tone for conversion, in accordance with a selection instruction from the member terminal (step S502). Using the selected type, the server 11 executes picture conversion of the uploaded image (step S503). Then, the server 11 counts the selected type of picture tone, counts up the number of times of this type, and stores the counted number of times in the number of times and type of picture conversion 104H (step S504).

Consequently, since such a case may arise that the content of area 104H$_1$ in which the type of picture tone with a largest number of times of selection varies, the content of area 104H$_1$ is updated (step S505). In addition, if a new picture tone is selected, the group will also vary and thus the group is updated (step S506).

Thereafter, the image, which has been picture-converted in step S503, is stored in the work buffer area 108 and is stored in the work area 202 (step S507). In addition, as the image attribute information 206, the member ID 206A indicative of the poster of the work and the date information 206B indicative of, e.g. the date of posting are written (step S508).

Accordingly, by the execution of the above process illustrated in the flowchart of FIG. 10, in the number of times of conversion and type of conversion 104H, the content of area 104H$_1$, in which the type of picture tone with a largest number of times of selection varies is stored, is updated, and the number of times and the type are stored.

Figure 11:
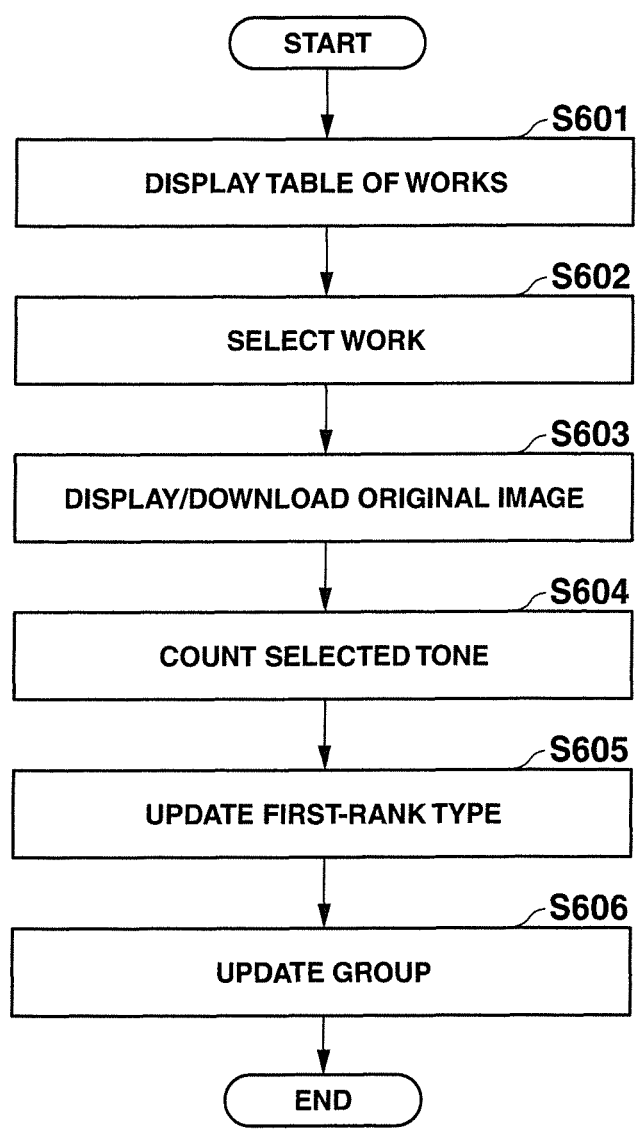
FIG. 11 is a flowchart illustrating the process procedure of a browse process.

FIG. 11 is a flowchart illustrating the process procedure of a browse process. The server 11 transmits a table-of-works display screen to the member terminal (step S601). In accordance with a selection instruction from the member terminal, the server 11 selects any one of the works from the table-of-works display screen (step S602). Subsequently, the server 11 executes such control that the original image, which is the image before the picture conversion of the selected work, is displayed on the member terminal, and the selected work is downloaded (step S603). Then, the server 11 counts the type of the downloaded picture tone, counts up the number of times of this type, and stores the counted number of times in the number of times of browsing and type of browsed works 104I (step S604).

Consequently, since such a case may arise that the content of area 104I$_1$ in which the type of picture tone with a largest number of times of browsing varies, the content of area $104I_1$ is updated (step S605). In addition, if a new work is downloaded, the group will also vary and thus the group is updated (step S606).

Accordingly, by the execution of the above process illustrated in the flowchart of FIG. 11, in the number of time of browsing and type of browsed works 104I, the content of $104I_1$, in which the type of picture tone with a largest number of browsing varies is stored, is updated, and the number of times and the type are stored.

Figure 12:
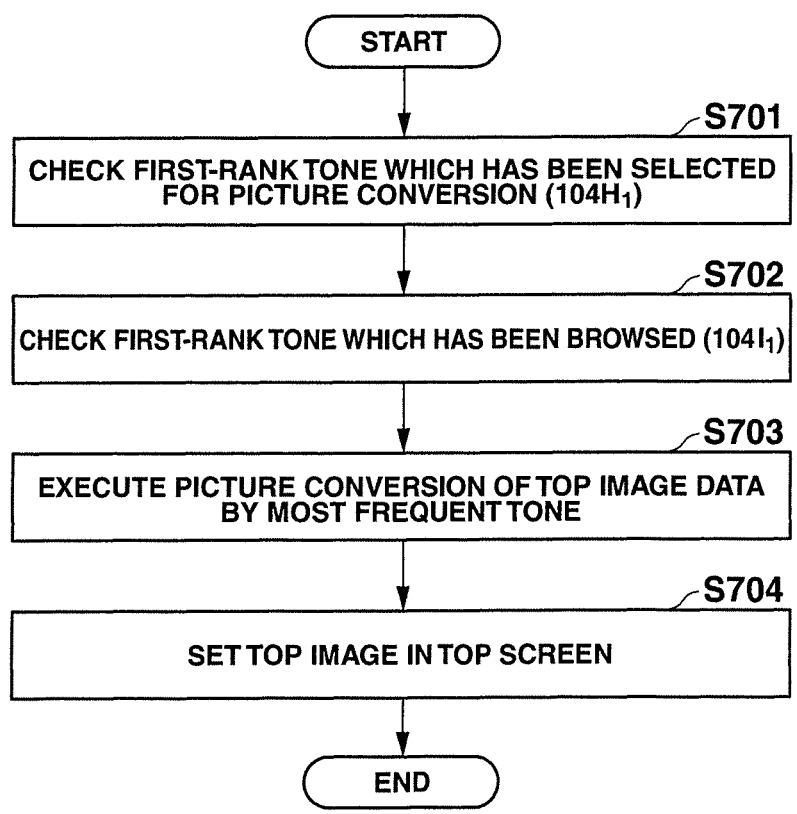
FIG. 12 is a flowchart illustrating the process procedure of a top screen update process.

FIG. 12 is a flowchart illustrating the process procedure of a top screen update process. The server 11 executes the process illustrated in this flowchart at a predetermined time, for example, once a day at midnight. Specifically, the server 11 reads out information written in the most frequent conversion type $104H_1$, and checks the first-rank type of picture tone which has been most frequently selected for picture conversion by the present member (step S701). In addition, the server 11 reads out information written in the most frequent browse type $104I_1$, and checks the first-rank type of picture tone which has been most frequently browsed by the present member (step S702). Next, the server 11 picture-converts the top image data which is the image data representative of the top image P2, by using the most frequent type of picture tone (step S703). The most frequent type, in this context, refers to the type of picture conversion, which corresponds to the greater of the number of times checked in step S701 and the number of times checked in step S702.

In the present embodiment, the type of picture tone for conversion is determined by using both the number of times of picture conversion with respect to each type, and the number of times of browsing with respect to each type. Alternatively, the type of picture tone for conversion may be determined by using only the number of times of picture conversion with respect to each type or only the number of times of browsing with respect to each type.

Thereafter, the top image P2, which is represented by the top image data, is set in the top screen P1 (step S704). Therefore, according to the present embodiment, the top image P2 of the top screen P1 of the member himself/herself is automatically picture-converted by the type of picture conversion that was used by the member himself/herself (the type stored in $104H_1$) or by the type of picture conversion that was browsed by the member himself/herself (the type stored in $104I_1$). Specifically, as illustrated in FIG. 13, the top image P2 of the top screen P1 of the member himself/herself is automatically picture-converted to pastel painting, pencil sketch or oil painting. Thus, an interest can be increased by merging a picture conversion technology into an SNS or by merging an SNS into a picture conversion technology.

In the meantime, in general, an SNS functions among closed members, but such a configuration may be adopted that general users, who are not registered as members, can browse works.

<Advantageous Effect of the Embodiment>

According to the present embodiment, since the top image data of a member is automatically converted to a picture-tone image data which suits the member's taste, such an advantage can be obtained that an interest does not decrease for both the member himself/herself and friends.

According to the present embodiment, members, who use the same type of picture conversion as the picture tone of the top image data of the present member, can be grouped, such an advantage can be obtained that the present member is easily associated with members having the same taste. In addition, such an advantage can be obtained that events, for instance, which are suited to the members of the group, can easily be notified to these members.

Figure 15:
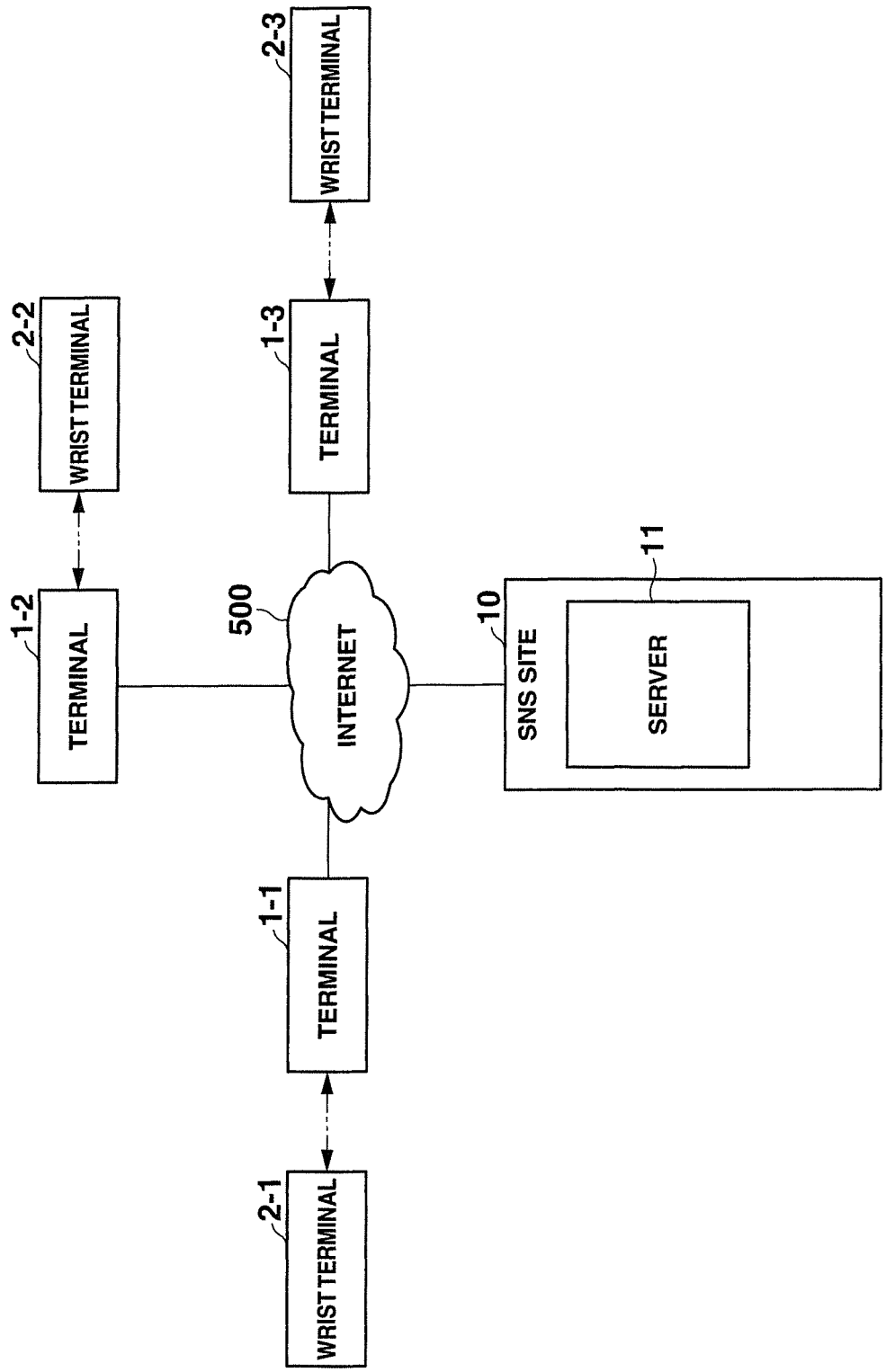
FIG. 15 is a block diagram illustrating the whole structure of the SNS system according to an embodiment of the invention.

FIG. 15 is a block diagram illustrating the whole structure of the SNS system according to the present embodiment.

The SNS site 10 including the server 11 is connected to terminals 1-1, 1-2, 1-3, . . . , of members via the Internet 500. The terminals 1-1, 1-2, 1-3, . . . , are, for instance, smartphones or personal computers. In addition, numerals 2-1, 2-2, 2-3, . . . , denote wristwatch-type wrist terminals which are, when used, attached to the arms, and the wrist terminals 2-1, 2-2, 2-3, . . . , are wirelessly connected to the terminals 1-1, 1-2, 1-3, . . . .

Figure 16A:
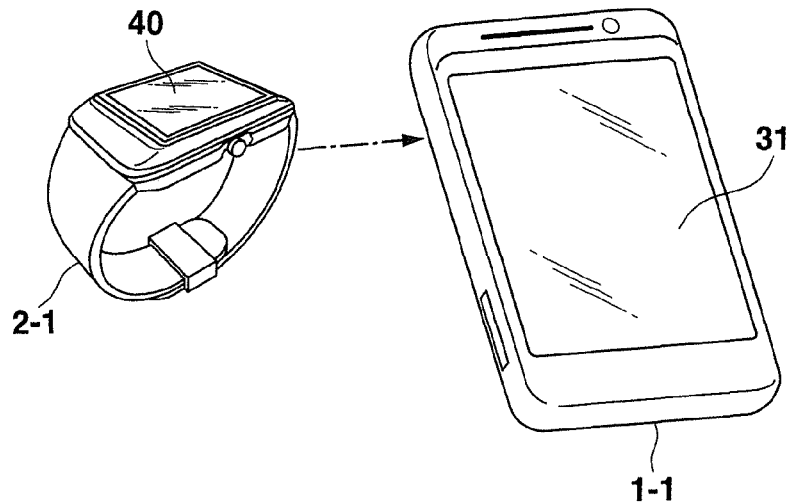
FIG. 16A, FIG. 16B, and FIG. 16C illustrate general views of a terminal and wrist terminal.
Figure 16B:
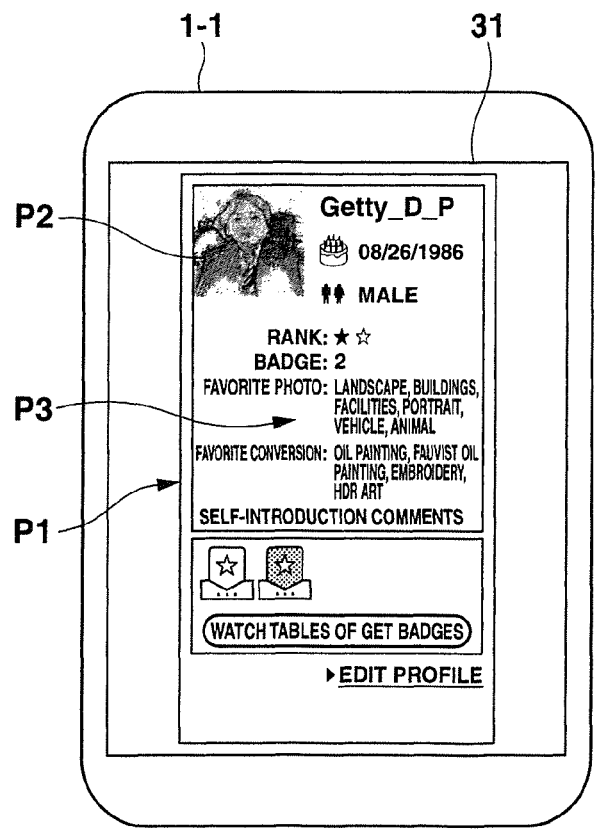
Figure 16C:
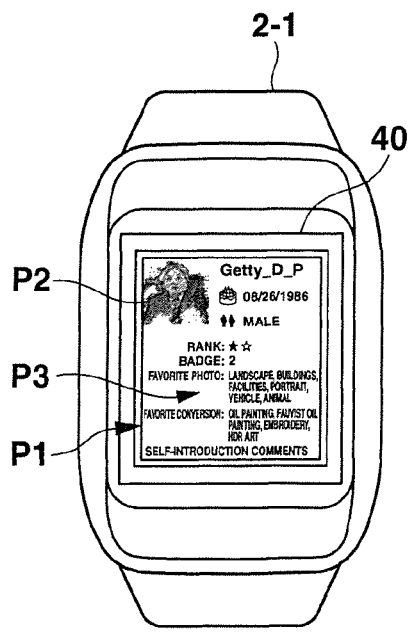

The relationship between the terminal 1-1 and wrist terminal 2-1 is described. As illustrated in FIG. 16A, the terminal 1-1 and wrist terminal 2-1 are wirelessly connected by, e.g. Bluetooth (trademark), and data can be exchanged between the terminal 1-1 and wrist terminal 2-1. FIG. 16B illustrates a state in which a profile screen P1 including a profile image P2, which is the top image, is displayed on a display section 31 of the smartphone-type terminal 1-1. FIG. 16C illustrates a state in which a profile image P2 is displayed on a display section 40 of the wrist terminal 2-1.

At this time, the display area of the display section 31 of the smartphone-type terminal 1-1 is different from the display area of the display section 40 of the wrist terminal 2-1, and the display area of the display section 40 of the wrist terminal 2-1 is much smaller than the display area of the display section 31 of the smartphone-type terminal 1-1. Thus, as is understood from the comparison between the display state of FIG. 16B and the display state of FIG. 16C, the display section 31 of the smartphone-type terminal 1-1 is caused to display the entirety of the profile screen P1 that is the home screen, but the display area of the display section 40 of the wrist terminal 2-1 is caused to display only a main part, i.e. about ⅔ of an upper part, of the profile screen P1 including the profile image P2.

According to this display mode, on the display section 40 of the wrist terminal 2-1 which has a small display area, the profile image P2 can be clearly displayed, without being extremely reduced in size, and the profile screen P1 can be displayed.

Needless to say, in the wrist terminal 2-1, if a scroll operation is performed, a lower part of the profile screen P1, which is not displayed in FIG. 16C, can be displayed.

Figure 17A:
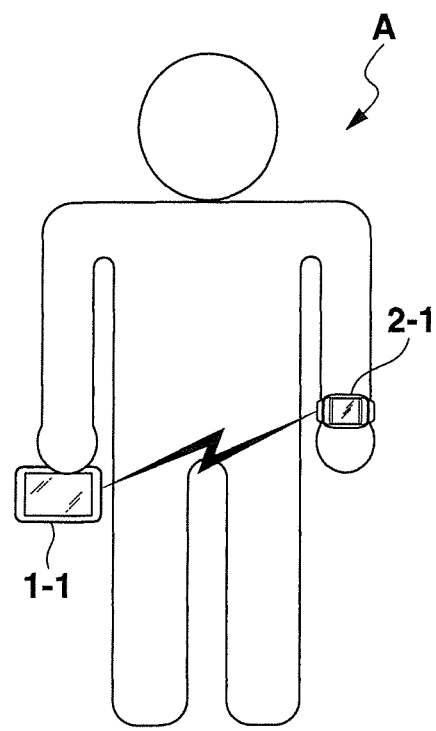
FIG. 17A and FIG. 17B illustrate states in which the terminal and wrist terminal are used.
Figure 17B:
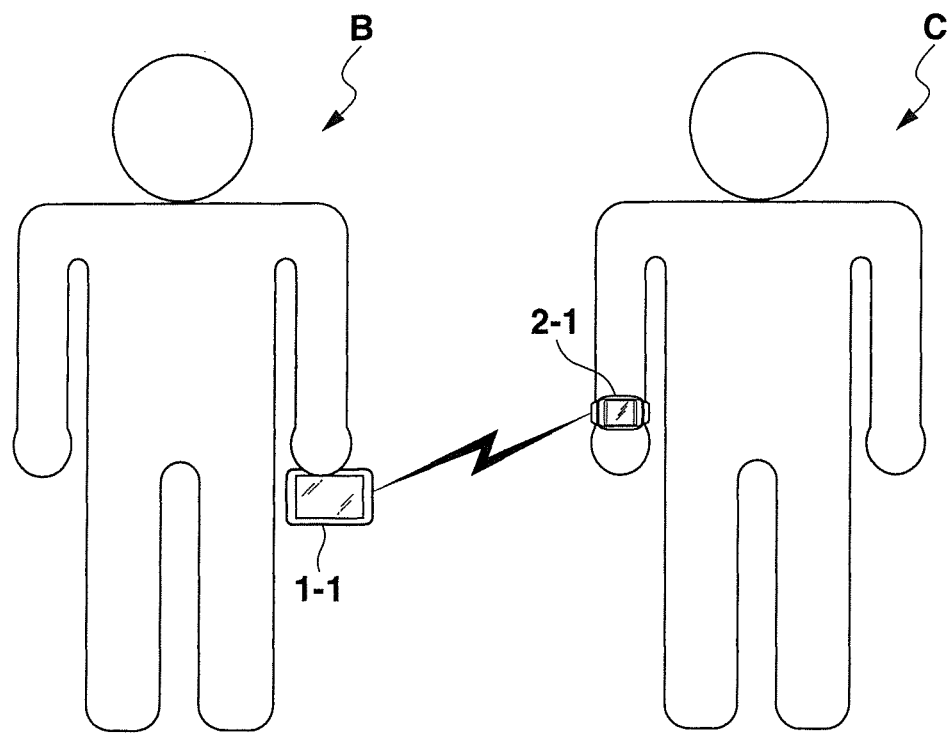

FIG. 17A and FIG. 17B illustrate states in which the terminal 1-1 and wrist terminal 2-1 are used. In FIG. 17A, member "A" possesses the terminal 1-1 and connects the terminal 1-1 to the SNS site 10 via a mobile phone network or the Internet, and also possesses the wrist terminal 2-1 and receives part of information, such as profile information of friend members or e-mails, by the wrist terminal 2-1.

According to this mode of use, even if the wrist terminal 2-1 does not have a function of connection to the Internet 500, the wrist terminal 2-1 can receive, for example, profile information of friend members, e-mails, etc.

In the example illustrated in FIG. 17B, when member "B" possesses the terminal 1-1 and member "C", who does not possess the terminal 101, possesses the wrist terminal 2-1, if member "B" and member "C" come close to each other, data exchange is enabled between the terminal 1-1 of member "B" and the wrist terminal 2-1 of member "C".

According to this mode of use, even if member "C" does not possess the terminal 1-1 which has the function of connection to the Internet 500, member "C" can obtain information which is acquired via the Internet 500.

Figure 18A:
FIG. 18A and FIG. 18B illustrate display examples of the wrist terminal.
Figure 18B:
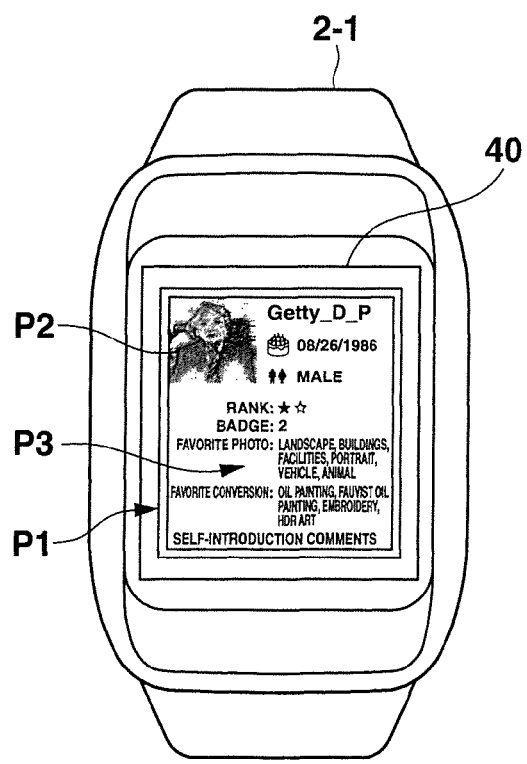

Next, display examples of the wrist terminal 2-1 are described. Usually, as illustrated in FIG. 18A, the wrist terminal 2-1 executes time display P4 including the present year/month/day, a day of the week, and hour/minute. By switching the display mode, the wrist terminal 2-1 displays, as illustrated in FIG. 18B, the profile screen P1 of the present member himself/herself or a friend member. By detecting that a friend member has come near, the profile of the friend member may automatically be displayed.

Even with this wrist terminal 2-1, a work, which is image data converted to a picture tone, can be browsed, and the number of times of browsing on the wrist terminal 2-1 is included in the above-described number of times of browsing.

Thereby, even if a member puts the terminal in a bag or the like, if the member wears a wrist terminal as a wristwatch, the member can easily confirm the profile or profile image of the member himself/herself or a friend member, or browse the work. In addition, when the picture tone of the profile screen of the friend member has been changed, a notification can be received or the profile image of the friend member can be automatically displayed.

Although the embodiments of the invention have been described, the present invention is not limited to these embodiments. The present invention includes inventions disclosed in patent claims and the scope of equivalents thereof. The picture conversion service is explained as an example of the image processing service and the tone change is explained as an example of the picture conversion. The picture conversion may include other types of conversion. For example, the type of the picture conversion may include a conversion of a facial picture to a portrait painting, a conversion of a still picture to a moving picture, a conversion of a two-dimensional image to a three-dimensional image. The type of picture conversion may include a conversion to a smiling face image, a conversion to a crying face, and a conversion to an angry face, a conversion to a moving picture with a different frame rate, time, and a moving speed, or the like.

<Advantageous Effect of the Embodiment>

According to the present embodiment, the profile screen which displays the profile of a member can be changed, on a friend-by-friend basis, to a screen which is converted to a picture-tone image that suits the taste of each friend. Specifically, such an advantage is obtained that different profile images of the same member can be viewed from respective friends.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A server executing a processing for a terminal of a member in a social network service system to which terminals of a plurality of members are connectable, the server comprising:
   a memory configured to store a home screen comprising top image data of the member;
   a selector configured to select a type of an image processing for the member; and
   a processor configured to process the top image data to be displayed on the home screen of the member in accordance with the type of the image processing which is selected by the selector, wherein the processor is configured to count the type of the image processing which is selected by the selector for each type, and process the top image data of the member based on a largest number of types selected by the member during a predetermined period.

2. The server of claim 1, wherein the processor is configured to group members having top image data of the same type as the type of the image processing for the top image data of the member.

3. The server of claim 1, wherein an image processing executed by the processor is a plurality of types of picture conversion processing.

4. A display method for a social network service system in which each member has its own home screen including top image data, the display method comprising:
   storing a home screen comprising top image data (a profile screen) for each member;
   selecting a type of an image processing;
   processing the top image data to be displayed on the home screen of the member in accordance with the selected type of the image processing; and
   counting the selected type of the image processing,
   wherein the processor is configured to process the top image data based on a largest number of the counted type during a predetermined period.

5. A server executing a processing for a terminal of a member in a social network service system to which terminals of a plurality of members are connectable the server comprising:
   a memory configured to store a home screen comprising top image data of the member;
   a selector configured to select a type of an image processing for the member; and
   a processor configured to process top image data to be displayed on a home screen of the member, wherein the processor is configured to count types of image processing selected by a friend member of the member for each friend member, and process the top image data of the member based on a largest number of types selected by the friend member during a predetermined period.

6. The server of claim 5, wherein the processor is configured to process top image data to be displayed on a home screen of the member for every friend member based on a largest number of types selected by the friend member to be stored in the memory.

7. The server of claim 5, wherein the server is configured to disclose image data uploaded from terminals of a plurality of members including a friend member to the members, and
   the processor is configured to count types of image processing of image data of the member browsed by the friend member, and process top image data of the member based on an image processing with the largest number of types browsed by the friend member during a predetermined period.

8. The server of claim 5, wherein the home screen of the member comprises a profile screen of the member, and the top image data comprises a profile image of the member.

9. The server of claim 5, wherein the processor is configured to group members having top image data of the same type as the type of the image processing for the top image data of the member.

10. The server of claim 5, wherein an image processing executed by the processor is a plurality of types of picture conversion processing.

11. A display method for a social network service system wherein image data is uploaded to a server from terminals of a plurality of members and is disclosed to members comprising a friend member, the display method comprising:
   selecting a type of an image processing;
   processing top image data to be displayed on a home screen of a member in accordance with the type of the image processing which is selected by the selector;
   counting the type of the image processing selected by the friend member for each member; and
   processing the top image data based on a largest number of types selected by the friend member during a predetermined period.

12. A display method for a social network service system wherein image data is uploaded to a server from terminals of a plurality of members and is disclosed to members, the display method comprising:
   storing a home screen comprising top image data of the member for each member;
   selecting a type of an image processing for the member;
   processing top image data to be displayed on the home screen of the member;
   counting types of the image processing of the browsed image data of the member for each type; and
   processing the top image data of the member based on a largest number of types browsed during a predetermined period.

13. A server executing a processing for a terminal of a member in a social network service system disclosing image data uploaded to a server from terminals of a plurality of members to the members the server comprising:
   a memory configured to store a home screen comprising top image data of the member for each member;
   a selector configured to select a type of an image processing for the member; and
   a processor configured to process top image data to be displayed on the home screen of the member, wherein the processor is configured to count types of image processing of the image data of the member for each type, and process the top image data of the member based on a largest number of types browsed during a predetermined period.

14. The server of claim 13, wherein the processor is configured to group members having top image data of the same type as the type of the image processing for the top image data of the member.

15. The server of claim 13, wherein an image processing executed by the processor is a plurality of types of picture conversion processing.

\* \* \* \* \*